United States Patent [19]

Shen et al.

[11] Patent Number: 4,546,164

[45] Date of Patent: Oct. 8, 1985

[54] PROCESS FOR PREPARING A ONE-COMPONENT ORGANOPOLYSILOXANE COMPOSITION

[75] Inventors: Ming Shen, Adrian; Richard C. McAfee, Tecumseh, both of Mich.

[73] Assignee: SWS Silicones Corporation, Adrian, Mich.

[21] Appl. No.: 709,846

[22] Filed: Mar. 11, 1985

Related U.S. Application Data

[63] Continuation of Ser. No. 635,464, Jul. 26, 1984, abandoned, which is a continuation of Ser. No. 445,302, Nov. 29, 1982, abandoned.

[51] Int. Cl.$^4$ ............................................. C08G 77/06
[52] U.S. Cl. ..................................... 528/15; 525/478; 528/31; 528/32; 524/783; 524/788; 524/786; 524/780; 524/791; 524/779
[58] Field of Search ............... 525/478; 528/15, 31, 528/32; 524/788, 783, 786, 780, 791, 779

[56] References Cited

U.S. PATENT DOCUMENTS

| | | | |
|---|---|---|---|
| 2,823,218 | 2/1958 | Spier et al. | 528/15 |
| 3,419,593 | 12/1968 | Willing | 528/15 |
| 3,814,730 | 6/1974 | Karstedt | 528/15 |
| 4,035,453 | 7/1977 | Hittmair et al. | 528/15 |

*Primary Examiner*—Melvyn I. Marquis

[57] ABSTRACT

A process for preparing a one-component organopolysiloxane composition which comprises heating a catalyst which is capable of promoting the addition of silicon-bonded hydrogen to aliphatically unsaturated groups in the presence of an organopolysiloxane having aliphatically unsaturated groups and/or a filler at an elevated temperature and thereafter adding an organosilicon compound having silicon-bonded hydrogen to the mixture after it has cooled. The resultant composition, which can be stored at room temperature can be crosslinked by heating to a temperature of about 100° C. or more.

9 Claims, No Drawings

PROCESS FOR PREPARING A ONE-COMPONENT ORGANOPOLYSILOXANE COMPOSITION

This is a continuation, of application Ser. No. 635,464, filed July 26, 1984, which is a continuation, of application Ser. No. 445,302, filed Nov. 29, 1982 both abandoned.

The present invention relates to a one-component organopolysiloxane composition, more particularly to a stable one-component organopolysiloxane composition and to a process for preparing the same.

BACKGROUND OF THE INVENTION

It is generally known that platinum catalysts will accelerate the addition of compounds containing silicon-bonded hydrogen atoms to compounds containing aliphatic unsaturation. In U.S. Pat. No. 3,419,593, Willing discloses that virtually any compound which contains an ≡SiH group can be reacted with practically any compound which contains aliphatic multiple bonds in the presence of a platinum compound such as chloroplatinic acid.

Since the known platinum catalysts substantially increase the cure rate of organopolysiloxane compositions, it is necessary that the compound containing the SiH group be stored separately from the mixture containing the compound having aliphatic multiple bonds and the platinum catalyst. The compound containing the SiH group is then mixed with the compound containing the aliphatic multiple bonds and platinum catalyst just prior to use.

In order to prepare a one-component composition containing an organopolysiloxane having silicon-bonded aliphatic unsaturation, an organosilicon compound having silicon-bonded hydrogen atoms and platinum group metals, it is necessary to add an inhibitor which retards or inhibits the addition of the silicon-bonded hydrogen atoms to the silicon-bonded aliphatically unsaturated groups at room temperature.

Various types of inhibitors which may be incorporated in platinum catalyzed organopolysiloxane compositions to inhibit the addition of the silicon-bonded hydrogen atoms to the silicon-bonded aliphatically unsaturated groups are described in, for example, U.S. Pat. No. 3,192,181 to Moore; U.S. Pat. No. 3,344,111 to Chalk; U.S. Pat. No. 3,445,420 to Kookootsedes et al; U.S. Pat. No. 3,383,356 to Nielsen; U.S. Pat. No. 3,882,083 to Berger et al and U.S. Pat. No. 3,992,335 to Itoh et al.

One of the disadvantages of incorporating inhibitors in an organopolysiloxane composition in order to obtain shelf stability is that often times the inhibitors will evaporate from the composition. The composition will then begin to cure unpredictably while in storage. Also, some of the inhibitors may change over a period of time and are not effective in inhibiting the addition of the silicon-bonded hydrogen atoms to the silicon-bonded aliphatically unsaturated groups. Thus, it is preferred that the one-component organopolysiloxane compositions be free of inhibitors, but still have an extended shelf-life.

Therefore, it is an object of the present invention to provide a one-component organopolysiloxane composition. Another object of the present invention is to provide a one-component organopolysiloxane composition having a long shelf-life. Still another object of the present invention is to provide a one-component organopolysiloxane composition which is free of inhibitors. A further object of the present invention is to provide a process for preparing a one-component organopolysiloxane composition which has an indefinite shelf-life.

SUMMARY OF THE INVENTION

The foregoing objects and others which will become apparent from the following description are accomplished in accordance with this invention, generally speaking, by providing a process for preparing a one-component composition which comprises (A) heating a mixture containing (1) an organopolysiloxane having aliphatically unsaturated groups and (2) a filler with (3) a catalyst capable of promoting the addition of silicon-bonded hydrogen atoms to silicon-bonded aliphatically unsaturated groups, to an elevated temperature and thereafter (B) adding (4) an organosilicon compound having silicon-bonded hydrogen atoms to the mixture after it has cooled. The resultant composition, which can be stored at room temperature without crosslinking, can be crosslinked by heating to an elevated temperature to form an elastomer.

DETAILED DESCRIPTION OF THE INVENTION

The organopolysiloxanes (1) used in the process for preparing the one-component organopolysiloxane composition of this invention may be any diorganopolysiloxane which could have been used heretofore in diorganopolysiloxane-based compositions which could be cross-linked by the addition of silicon-bonded hydrogen to silicon-bonded aliphatic multiple bonds or through ionization radiation to form elastomers. Diorganopolysiloxanes which may be used are especially those of the general formula:

wherein R represents the same or different monovalent or substituted monovalent hydrocarbon radicals having up to 18 carbon atoms, in which an average of at least two aliphatically unsaturated groups are present per molecule and n is an integer having a value of at least 10.

Although this is generally not shown in the formula illustrated above, the siloxane chain of the aforementioned diorganopolysiloxanes may contain siloxane units in addition to the diorganosiloxane units ($SiR_2O$). Examples of such other siloxane units, which are generally present only as impurities, are those corresponding to the formulas $RSiO_{3/2}$, $R_3SiO_{\frac{1}{2}}$ and $SiO_{4/2}$, where R is the same as above. It is, however, preferred that such other siloxane units be present in an amount less than 1 mole percent. Still other siloxane units, for example, those of the formula —$SiR_2R'SiR_2O$—, where R is the same as above and R' is a bivalent hydrocarbon radical, for example, a phenyl radical, may be present in larger amounts.

It is preferred that the hydrocarbon radicals represented by R contain from 1 to 18 carbon atoms.

Examples of hydrocarbon radicals represented by R are alkyl radicals, for example, the methyl and ethyl radical, as well as propyl, butyl, hexyl and octadecyl radicals; alkenyl radicals such as the vinyl, allyl, ethylallyl and butadienyl radicals; aryl radicals such as the phenyl radical; alkaryl radicals such as the tolyl radicals; and aralkyl radicals such as the beta-phenylethyl radical.

Examples of substituted monovalent hydrocarbon radicals represented by R are halogenated hydrocarbon radicals, such as the 3,3,3-trifluoropropyl radical, chlorophenyl and bromotolyl radicals; and cyanoalkyl radicals, such as the beta-cyanoethyl radical.

Because of their availability, it is preferred that at least 80 percent of the R radicals be methyl radicals.

Preferred diorganopolysiloxanes are those having trimethylsiloxy or vinyldimethylsiloxy groups as terminal units and contain from 0.01 to 5 mole percent of vinyldimethylsiloxy or methylvinylsiloxane units. More preferably the diorganopolysiloxanes are those containing from 0.02 to 2 mole percent of vinyldimethylsiloxy or methylvinylsiloxane units and the remaining diorganosiloxane units are dimethylsiloxane units.

When the compositions are to be cross-linked by the addition of silicon-bonded hydrogen to a silicon-bonded aliphatic multiple bond, it is essential that the diorganopolysiloxane which constitutes the base of the composition have at least two alkenyl radicals for each molecule of diorganopolysiloxane.

The viscosity of the diorganopolysiloxane used in the preparation of the composition of this invention is preferably 100 mPa.s at 25° C. and more preferably from 200 to $10^6$ mPa.s at 25° C.

In addition to the diorganopolysiloxanes which constitute the base of these compositions, the compositions of this invention also contain fillers which have been or could have been used heretofore in the preparation of organopolysiloxane elastomers by the addition of silicon-bonded hydrogen to aliphatic multiple bonds or by ionization radiation.

The fillers can be reinforcing and/or non-reinforcing fillers. Examples of reinforcing fillers, that is fillers with a surface area of at least 50 m$^2$/g, are pyrogenically produced silicon dioxide, silicon dioxide aerogels, that is to say, silicic acid hydrogels dehydrated so as to maintain the structure, and precipitated silicon dioxide. Examples of non-reinforcing fillers, that is fillers having a surface area of less than 50 m$^2$/g, are calcium carbonate, quartz powder, diatomaceous earth, titanium dioxide, zirconium silicate, aluminum silicate, zinc oxide, plaster of paris, so-called "molecular sieves", and asbestine, that is to say a magnesium-calcium silicate which resembles talc. All these fillers, but especially the reinforcing fillers, can have organosilyl groups on their surface if they have been pretreated, for example, with trimethylhalogenosilanes, as described in, for example, U.S. Pat. No. 2,610,167, or if they have been manufactured, for example, by reaction of aqueous silica sols with organohalogenosilanes, or have been rendered hydrophobic in some other way.

Also, the fillers may be treated with other silicon compounds, such as hexamethyldisilazane and vinyltrialkoxysilanes to impart organosilyl groups to the surfaces of the treated fillers.

Preferably, the fillers are used in amounts of from 0 to 200 percent by weight, especially from 5 to 150 percent by weight, based on the total weight of organopolysiloxane components. Non-reinforcing fillers are generally used in amounts of at least 20 percent by weight, based on the total weight of all organopolysiloxanes present, whereas reinforcing fillers are generally used in amounts of from 1 to 50 percent by weight, based on the total weight of all organopolysiloxanes present. It is, however, possible to use larger amounts of reinforcing fillers provided that the workability of the compositions does not suffer as a result. The amount of reinforcing fillers may exceed 50 percent by weight, if for example, the fillers have been obtained from the reaction of aqueous silica sols with organohalogenosilanes.

The composition of this invention may also contain fibrous fillers, such as glass fibers having an average length up to about 0.5 mm, and/or asbestos fibers.

Examples of catalysts which promote the addition of silicon-bonded hydrogen to aliphatic multiple bonds are metallic finely dispersed platinum, ruthenium, rhodium, palladium and iridium. These metals may be dispersed on carriers, such as silicon dioxide, aluminum oxide or activated carbon. Furthermore, it is possible to use compounds or complexes of these metals, such as PtCl$_4$, H$_2$PtCl$_6$.6H$_2$O, Na$_2$PtCl$_4$.4H$_2$O, platinum-olefin complexes, platinum-alcohol complexes, platinum-alcoholate complexes, platinum-ether complexes, platinum-aldehyde complexes, platinum-ketone complexes, ammonium platinum complexes, platinum-vinyl-siloxane complexes, especially platinum-divinyltetramethyldisiloxane complexes with or without any detectable, inorganically bonded halogen, trimethylenedipyridine platinum dichloride; as well as iron, nickel and cobalt carbonyls.

When one of the above metals, compounds and/or complexes of said metals is used as a catalyst to promote the addition of silicon-bonded hydrogen to aliphatic multiple bonds, then such catalysts are preferably used in an amount of from 0.5 to 500 ppm (parts per million by weight), calculated as the metallic elements and based on the weight of the diorganopolysiloxane containing aliphatic multiple bonds.

When the composition of this invention is to be cross-linked by the addition of silicon-bonded hydrogen to a silicon-bonded aliphatic multiple bond, then the composition must contain an organosilicon compound having at least 2 silicon-bonded hydrogen atoms per molecule, an organopolysiloxane having aliphatic multiple bonds and a catalyst which promotes the addition of silicon-bonded hydrogen to the silicon-bonded aliphatic multiple bonds.

The organosilicon compound containing at least 2 silicon-bonded hydrogen atoms per molecule is generally an organopolysiloxane, especially a methylhydrogenpolysiloxane.

The organosilicon compound may contain units represented by the formula $$R_a{}^1SiO_{4-a/2}$$

where R$^1$ represents hydrogen or is the same as R, in which at least 2, and preferably 3, silicon-bonded hydrogen atoms are present per molecule and a is 1, 2 or 3. The preferred compound contains the following units: RHSiO-units, R$_2$SiO— and R$_3$SiO$_{\frac{1}{2}}$—units in which a silicon-bonded hydrogen atom is present for each 2 to 100 silicon atoms in the compound and has a viscosity of from 10 to 50,000 mPa.s at 25° C.

The organosilicon compound has at least 2 silicon-bonded hydrogen atoms per molecule and is preferably used in an amount of from 0.5 to 20 percent by weight, based on the weight of the diorganopolysiloxane containing aliphatic multiple bonds.

The one-component organopolysiloxane composition of this invention may be prepared by heating the catalyst (3), which is capable of promoting the addition of silicon-bonded hydrogen to silicon-bonded aliphatically unsaturated groups in the presence of the organopolysiloxane (1) having silicon-bonded aliphatically unsaturated groups and the filler (2) at an elevated temperature and thereafter adding (4) an organosilicon compound containing silicon-bonded hydrogen atoms to the resultant mixture after it has cooled below a temperature at which crosslinking will occur to form a one-component composition.

In addition, the organopolysiloxane composition of this invention may be prepared by heating a mixture containing the catalyst (3) which is capable of promoting the addition of silicon-bonded hydrogen to silicon-bonded aliphatically unsaturated groups and an organopolysiloxane (1) having silicon-bonded aliphatic unsaturation at an elevated temperature and thereafter adding a filler (2) to the resultant mixture. The organosilicon compound (4) containing silicon-bonded hydrogen atoms is added to the resultant mixture after it has cooled below a temperature at which crosslinking will occur to form a one-component composition capable of being crosslinked at an elevated temperature to form an elastomer.

Also, the organopolysiloxane composition may be prepared by heating a mixture containing the catalyst (3) in the presence of a filler (2) to an elevated temperature and thereafter adding organopolysiloxane (1) to the resultant mixture. The organosilicon compound (4) is added to the mixture after it has cooled below a temperature at which crosslinking will occur to form a one-component composition.

In preparing the one-component composition of this invention, it is preferred that the catalyst (3) be heated in the presence of the organopolysiloxane (1) and/or filler (2) at a temperature of from about 70° C. up to about 300° C. and more preferably from about 100° to about 250° C. for at least 1 minute and more preferably from about 30 minutes up to about 3 hours. Obviously, the higher the temperature, the shorter the heating time. The composition may be heated in the presence of air or an inert atmosphere such as nitrogen at atmospheric pressure. Higher or lower pressures may be employed, if desired.

The resultant composition is cooled, preferably below about 60° C., and then mixed with the organosilicon compound (4). The composition may be stored at ambient temperature until it is ready for use.

These compositions may be crosslinked by heating them to a temperature of from about 100° C. to about 400° C., and more preferably to a temperature of from about 175° to 250° C. Crosslinking may also be achieved by other sources. Examples of other sources are ultraviolet, X-ray, microwave energy, alpha, beta and/or gamma radiation. When the compositions are to be cross-linked exclusively by radiation, a dose of from 5 to 8 megarad is preferred.

In preparing these compositions, it is not essential that all the organopolysiloxane (1) and/or filler (2) be mixed with the catalyst (3) and heated. It is, however, preferred that at least one-half of the filler (2) and/or the organopolysiloxane (1) be mixed with catalyst (3) and heated and then the remainder of the organopolysiloxane (1) and/or filler (2) may be added to the mixture. The mixture is preferably cooled below about 60° C. before the organosilicon compound (4) is added. Likewise, a portion of the catalyst (3) may be added to the organopolysiloxane (1) and the remainder may be admixed with the organosilicon compound (4) or added prior to, simultaneously with, or after the addition of the organosilicon compound (4).

One advantage of the composition of this invention over compositions known heretofore is that the catalyst (3) may be heated in the presence of either the organopolysiloxane (1), the filler (2), or in the presence of a mixture of organopolysiloxane (1) and filler (2), then cooled and mixed immediately with the organosilicon compound (4) and stored without any apparent evidence of crosslinking.

Additional substances which may be added to the compositions of this invention are heat stabilizers, antioxidants, processing aids such as organopolysiloxanes containing silicon-bonded hydroxyl groups and having a maximum of 100 silicon atoms per molecule, and plasticizers, as well as substances which may improve other properties of the elastomers.

Examples of plasticizers are especially trimethylsiloxy end-blocked dimethylpolysiloxanes having a maximum of 1000 silicon atoms per molecule.

Adhesive promoters, such as glycidyloxypropyltrialkoxysilane, may be used to improve the adhesion of the elastomers to the surfaces.

The compositions and elastomers prepared in accordance with this invention have the same type of utility as other organopolysiloxanes. They are especially useful for potting and encapsulating applications. Also, they may be used as coatings, as gaskets and as sealants.

The following examples are for purposes of illustration and are not to be construed as being limited to the following embodiments. In these examples all parts are by weight unless otherwise specified.

Preparation of Platinum Catalyst

The platinum catalyst used in the following examples is prepared in the following manner:

An aminofunctional silicon composition is prepared by heating a mixture containing about 226.4 parts of octamethylcyclotetrasiloxane, 22.4 parts of $\beta$-(aminoethyl)-r-aminopropyltrimethoxysilane and 0.29 parts of potassium hydroxide to a temperature of 145° C. for three hours. After cooling the liquid product to room temperature, 0.29 parts of acetic acid are added to neutralize the potassium hydroxide. The product is filtered and a liquid product having a viscosity of about 40 mPa.s at 25° C. is recovered.

About 28.8 parts of the aminofunctional silicon composition prepared above are added to a reactor under an atmosphere of nitrogen. About 100 parts of isopropanol, 1.04 parts of chloroplatinic acid hexahydrate, and 45 parts of toluene are added to the reactor and the reaction mixture is stirred for 30 minutes at 27° C. The resultant transparent orange-colored product which contains 0.16 weight percent of platinum is identified as being an ammonium platinum complex.

EXAMPLE 1

About 100 parts of a trimethylsiloxy endblocked diorganopolysiloxane which consists of 99.86 mole percent of dimethylsiloxane units and 0.14 mole percent of methylvinylsiloxane units and having a Williams plasticity value of about 105 are mixed with 57 parts of pyrogenically prepared silicon dioxide having a surface area of about 200 m²/g, and 2.5 parts of the ammonium platinum complex prepared above and heated for 1 hour at 180° C. in the presence of nitrogen and then cooled to room temperature. To the resultant mixture are added 5 parts of the pyrogenically prepared silicon dioxide, 0.8 parts of the ammonium platinum complex and 1.6 parts of methylhydrogenpolysiloxane having a silicon to hydrogen ratio of 1:1 and a viscosity of 5.0 mPa.s at 25° C. The mixture is then stored at room temperature for 2 months. The plasticity values are essentially unchanged after storage. A sample of the stored material is extruded to form a film, press-cured at about 175° C. for 10 minutes and then post-cured at 204° C. for about 4 hours. The properties of the resultant elastomer are essentially the same after storage as before storage.

EXAMPLE 2

The procedure of Example 1 is repeated except that 80 parts of a pyrogenically prepared silicon dioxide having a surface area of 200 m²/g are combined with 2.5 parts of the ammonium platinum complex prepared above and heated for 1 hour at 180° C. in the presence of nitrogen and then cooled to room temperature. About 100 parts of a trimethylsiloxy endblocked diorganopolysiloxane having 99.86 mole percent of dimethylsiloxane units and 0.14 mole percent of methylvinylsiloxane units and a Williams plasticity value of about 105, 0.8 parts of the ammonium platinum complex and 1.6 parts of methylhydrogen polysiloxane having a silicon to hydrogen ratio of 1:1 and a viscosity of 5.0 mPa.s at 25° C. are added to the resultant mixture. The plasticity value of the resultant composition is substantially unchanged after storing for 1 month at room temperature.

EXAMPLE 3

About 100 parts of a trimethylsiloxy endblocked diorganopolysiloxane which consists of 99.86 mole percent of dimethylsiloxane units and 0.14 mole percent of methylvinylsiloxane units and having a Williams plasticity value of about 105 are mixed with 2.5 parts of the ammonium platinum complex prepared above and heated for 1 hour at 180° C. in the presence of nitrogen and then cooled to room temperature. To the resultant mixture are added 80 parts of pyrogenically prepared silicon dioxide having a surface area of about 200 m²/g, and 1.6 parts of methylhydrogenpolysiloxane having a silicon to hydrogen ratio of 1:1 and a viscosity of 5.0 mPa.s at 25° C. The mixture is then stored at room temperature for 2 months. The plasticity value of the resultant composition is substantially unchanged after storing for 2 months at room temperature. The stored composition cures to an elastomer when heated at 175° C. for 10 minutes.

EXAMPLE 4

The procedure of Example 1 is repeated except that 70 parts of calcium carbonate is substituted for the pyrogenically prepared silicon dioxide. The composition shows no apparent crosslinking after being stored for 1 month at room temperature.

EXAMPLE 5

The procedure of Example 1 is repeated except 40 parts of calcium carbonate and 40 parts of quartz powder are substituted for 80 parts of pyrogenically prepared silicon dioxide. No apparent crosslinking is observed after storing for 1 month at room temperature.

EXAMPLE 6

The procedure of Example 2 is repeated except that 20 parts of titanium dioxide, 30 parts of pyrogenically prepared silicon dioxide and 30 parts of quartz powder are substituted for the 80 parts of pyrogenically prepared silicon dioxide. No apparent crosslinking is observed after storing for 1 month at room temperature.

EXAMPLE 7

The procedure of Example 1 is repeated except that a solution of chloroplatinic acid in isopropanol is substituted for the ammonium platinum complex in such an amount that 15 ppm of platinum are present.

The resultant composition shows no apparent crosslinking after being stored for 1 month. It is then extruded and press-cured for 10 minutes at 175° C. and then post-cured at 204° C. The properties of the resultant elastomer are essentially unchanged after storage.

EXAMPLE 8

The procedure of Example 7 is repeated except that 15 ppm of a platinum-ketone complex solution are substituted for the chloroplatinic acid.

The resultant composition is stored for 1 month, then extruded, press-cured and post-cured. The properties of the resultant elastomer are essentially unchanged after storage.

The platinum-ketone complex is prepared by adding one part of chloroplatinic acid ($H_2PtCl_6.6H_2O$) to 200 parts of cyclohexanone which has been heated to 80° C. The solution is maintained at 80° C. for 45 minutes and then dried over anhydrous sodium sulfate.

EXAMPLE 9

The procedure of Example 1 is repeated except that 100 parts of a vinyl endblocked dimethylpolysiloxane having a viscosity of 1000 mPa.s at 25° C. is substituted for the trimethylsiloxy endblocked diorganopolysiloxane. About 9.6 parts of a methylhydrogenpolysiloxane having a silicon to hydrogen ratio of 6:1 and a viscosity of 5.0 mPa.s at 25° C. is substituted for the methylhydrogenpolysiloxane having a silicon to hydrogen ratio of 1:1.

The resultant composition is essentially unchanged after being stored for 1 month at room temperature.

Comparison Example $V_1$

About 100 parts of a trimethylsiloxy endblocked diorganopolysiloxane which consists of 99.86 mole percent of dimethylsiloxane units and 0.14 mole percent of methylvinylsiloxane units and having a Williams plasticity value of about 105 are mixed with 3.0 parts of the ammonium platinum complex prepared above, 80 parts of pyrogenically prepared silicon dioxide having a surface area of 200 m²/g and mixed with 1.6 parts of methylhydrogen polysiloxane having a silicon to hydrogen ratio of 1:1 and a viscosity of 5 mPa.s at 25° C. The mixture cures at room temperature to a solid in about 10 minutes.

Comparison Example $V_2$

The procedure of Example 7 is repeated except that the heating step is omitted. The composition cures to a solid in less than 240 minutes at room temperature.

Comparison Example $V_3$

The procedure of Example 8 is repeated except that the heating step is omitted. Crosslinking is observed after about 200 minutes at room temperature.

Comparison Example V$_4$

The procedure of Example 9 is repeated except the heating step is omitted. The composition cures to a solid in about 30 minutes at room temperature.

What is claimed is:

1. A process for preparing a stable one-component composition which is capable of being cured to an elastomer at an elevated temperature which comprises (A) heating a mixture consisting essentially of a platinum catalyst which is capable of promoting the addition of silicon-bonded hydrogen to silicon-bonded aliphatically unsaturated groups and a filler to a temperature of at least 70° C. and thereafter (B) mixing an organopolysiloxane having a viscosity of at least 100 mPa.s at 25° C. and having an average of at least two silicon-bonded aliphatically unsaturated groups per molecule and an organosilicon compound having at least 2 silicon-bonded hydrogen atoms per molecule with the catalyst-filler mixture at a temperature below that at which crosslinking of the organopolysiloxane will occur.

2. The process of claim 1, wherein the filler is present in an amount of from 5 to 200 percent by weight based on the total weight of the organopolysiloxane.

3. The process of claim 1, wherein the filler and catalyst mixture is heated to a temperature of at least 70° C. and then cooled to at least 60° C. before the organopolysiloxane having silicon-bonded aliphatically unsaturated groups and the organosilicon compound are added to the mixture.

4. The process of claim 1, wherein a mixture containing filler, organopolysiloxane having an average of at least two silicon-bonded aliphatically unsaturated groups and catalyst is heated to a temperature of at least 70° C. and then the organosilicon compound is added to the mixture at a temperature below that at which crosslinking will occur.

5. The process of claim 4, wherein a portion of the filler and the organopolysiloxane having silicon-bonded aliphatically unsaturated groups is heated with the catalyst to a temperature of at least 70° C., then the remainder of the filler and the organopolysiloxane having silicon-bonded aliphatically unsaturated groups and the organosilicon compound is added to the mixture at a temperature below that at which crosslinking will occur.

6. The process of claim 1, wherein composition containing the organopolysiloxane, catalyst, filler and organosilicon compound is heated to a temperature of at least 100° C. to promote cross-linking.

7. The process of claim 3, wherein the composition containing the organopolysiloxane, filler, catalyst and organosilicon compound is heated to at least 100° C. to promote crosslinking.

8. The process of claim 4, wherein the composition containing the organopolysiloxane, filler, catalyst and organosilicon compound is heated to at least 100° C. to promote crosslinking.

9. The process of claim 1, wherein the organopolysiloxane having silicon-bonded aliphatically unsaturated groups is added to the filler-catalyst mixture at an elevated temperature and thereafter the organosilicon compound is added at a temperature below that at which crosslinking occurs.

* * * * *